(12) United States Patent
Zhang et al.

(10) Patent No.: US 11,159,409 B2
(45) Date of Patent: Oct. 26, 2021

(54) MESH NETWORK DEVICE ADJUSTING BROADCAST DWELL INTERVAL BASED ON TRENDLINE PREDICTION OF FUTURE THROUGHPUT

(71) Applicant: Cisco Technology, Inc., San Jose, CA (US)

(72) Inventors: Lele Zhang, Shanghai (CN); Li Zhao, Shanghai (CN); Chuanwei Li, Shanghai (CN); Feiliang Wang, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 13 days.

(21) Appl. No.: 16/419,124

(22) Filed: May 22, 2019

(65) Prior Publication Data
US 2020/0374208 A1 Nov. 26, 2020

(51) Int. Cl.
*H04L 12/26* (2006.01)
*H04W 84/18* (2009.01)
(Continued)

(52) U.S. Cl.
CPC .......... *H04L 43/0888* (2013.01); *H04L 41/12* (2013.01); *H04L 45/02* (2013.01); *H04W 4/06* (2013.01); *H04W 84/18* (2013.01)

(58) Field of Classification Search
None
See application file for complete search history.

(56) References Cited

U.S. PATENT DOCUMENTS 9,020,008 B2 * 4/2015 Hui ..................... H04W 72/005
                                                        375/132
9,673,858 B2 6/2017 Hui et al.
(Continued)

OTHER PUBLICATIONS

Thubert et al., "IETF 6TSCH: Combining IPv6 Connectivity with Industrial Performance" [online], Jul. 2013, [retrieved on Nov. 9, 2017]. Retrieved from the Internet: <URL: https://www.researchgate.net/profile/Pascal_Thubert/publication/261430569_IETF_6TSCH_Combining_IPv6_Connectivity_with_Industrial_Performance/links/56c4887c08ae7fd4625a28c8/IETF-6TSCH-Combining-IPv6-Connectivity-with-Industrial-Performance.pdf?origin=publication_detail>, pp. 1-7.

(Continued)

*Primary Examiner* — Christopher T Wyllie
(74) *Attorney, Agent, or Firm* — Leon R. Turkevich

(57) ABSTRACT

In one embodiment, a method comprises: determining, by a network device in a wireless data network, a past throughput of broadcast data packets transmitted at broadcast transmission intervals of a prescribed broadcast schedule over a selected measurement interval, the broadcast transmission intervals each adjacent to unicast transmission intervals allocated in the wireless data network, each of the broadcast transmission intervals in the prescribed broadcast schedule initially set at a prescribed duration; predicting, by the network device, a predicted throughput of a future broadcast transmission interval of the prescribed broadcast schedule, for transmission of at least a future broadcast data packet, based on executing a trendline prediction of the predicted throughput using the past throughput over the selected measurement interval; and adjusting the corresponding prescribed duration of the future broadcast transmission interval, relative to the corresponding adjacent unicast transmission interval following the future broadcast transmission interval, based on the predicted throughput.

18 Claims, 10 Drawing Sheets

(51) Int. Cl.
*H04L 12/751* (2013.01)
*H04L 12/24* (2006.01)
*H04W 4/06* (2009.01)

(56) References Cited

U.S. PATENT DOCUMENTS

| | | | |
|---|---|---|---|
| 9,986,297 B2 | 5/2018 | Hardin et al. | |
| 10,104,712 B2 | 10/2018 | Hui et al. | |
| 2003/0174701 A1* | 9/2003 | Angle | H04L 49/254 370/390 |
| 2007/0104151 A1* | 5/2007 | Papasakellariou | H04L 5/0053 370/335 |
| 2013/0016758 A1* | 1/2013 | Hui | H04W 72/005 375/134 |
| 2013/0022084 A1* | 1/2013 | Vasseur | H04B 1/713 375/134 |
| 2013/0028295 A1* | 1/2013 | Hui | H04B 1/713 375/135 |
| 2013/0086235 A1* | 4/2013 | Ferris | G06F 9/505 709/223 |
| 2014/0266795 A1* | 9/2014 | Tseng | G08G 1/0112 340/905 |
| 2015/0256241 A1* | 9/2015 | Jia | H04B 7/0452 370/330 |
| 2017/0230804 A1 | 8/2017 | Weidenfeller | |
| 2019/0199759 A1* | 6/2019 | Anderson | H04N 7/18 |
| 2020/0374208 A1* | 11/2020 | Zhang | H04L 41/12 |

OTHER PUBLICATIONS

Bhattacharya et al., "A Computational Exploration of the Efficacy of Fibonacci Sequences in Technical Analysis and Trading", Annals of Economics and Finance, 1, 2006, pp. 185-196 (12 pages).

Cisco, "Cisco Connected Grid WPAN Module for CGE 1000 Series Installation and C-Mesh Configuration Guide", [online], Jun. 2017, [retrieved on May 10, 2019]. Retrieved from the Internet: URL: <https://www.cisco.com/c/en/us/td/docs/routers/connectedgrid/modules/wpan/release_5-0/ Cisco_Connected_Grid_WPAN_Module_for_CGR_1000_Series_Installation_and_CG-Mesh_Configuration_Guide.pdf>, pp. 1-52.

Cisco, "Connected Utilities—Field Area Network 2.0 Design and Implementation Guide", [online], Jan. 2016, [retrieved on Oct. 10, 2018]. Retrieved from the Internet: URL: <https://www.cisco.com/c/en/us/td/docs/solutions/Verticals/Utilities/FAN/2-0/CU-FAN-2-DIG.pdf>, 182 pages.

Xie et al., "Collision Minimized Firmware Upgrade for LLNS Using Multiple Multicast Domains", Cisco Systems, Inc. Feb. 16, 2018, IP.com No. IPCOM000252867D, 9 pages.

Thubert et al, "Enabling Determinism in a Best Effort Hopping Sequence Time Slotted Channel Hopping Mesh", [online], May 23, 2018, [retrieved on Jan. 7, 2019]. Retrieved from the Internet: URL: <https://www.tdcommons.org/cgi/viewcontent.cgi?article=2270&context=dpubs_series>, pp. 1-11.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Wikipedia, "Fibonacci number", [online], Jan. 6, 2019, [retrieved on Jan. 7, 2019]. Retrieved from the Internet: URL: <https://en.wikipedia.org/w/index.php?title=Fibonacci_number&printable=yes>, pp. 1-21.

Wikipedia, "Fibonacci retracement", [online], Oct. 13, 2018, [retrieved on Jan. 7, 2019]. Retrieved from the Internet: URL: <https://en.wikipedia.org/w/index.php?title=Fibonacci_retracement&printable=yes>, pp. 1-3.

Zhang et al., U.S. Appl. No. 16/289,859, filed Mar. 1, 2019.

\* cited by examiner

MESH NETWORK DEVICE ADJUSTING BROADCAST DWELL INTERVAL BASED ON TRENDLINE PREDICTION OF FUTURE THROUGHPUT

TECHNICAL FIELD

The present disclosure generally relates to a mesh network device adjusting a broadcast dwell interval based on a trendline prediction of future throughput.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Large-scale wireless mesh networks can be deployed in the form of Internet Protocol version 6 (IPv6) wireless radio frequency (RF) mesh networks, deployed for example using wireless link layer protocols such as IEEE 802.15.4e and/or IEEE 802.15.4g (referred to herein as "IEEE 802.15.4e/g"). Such large-scale wireless mesh networks (also referred to as field area networks (FANs)) can be used for deployment of, for example, a connected grid mesh (CG-mesh) network advanced metering infrastructure (AMI). The CG-mesh network can include thousands of IEEE 802.15.4e/g based resource-constrained (e.g., low-power) network devices (also referred to herein as Low Power and Lossy Network (LLN) devices), where each LLN network device can reach, within its transmission range, hundreds of neighboring network devices. Hence, noise and/or interference on a wireless RF channel can affect communications between LLN network devices.

A field area network can deploy time slotted channel hopping to avoid interfering transmissions from neighboring network devices. A network device executing time slotted channel hopping can be configured for transmitting radio signals at an allocated fixed-length timeslot and a corresponding allocated frequency channel according to a prescribed "schedule" that allocates a frequency channel according to a prescribed pseudo-random sequence. A field area network can deploy within the time slotted channel hopping schedule a combination of a unicast schedule and a broadcast schedule, where a first subset of the fixed-length timeslots are allocated for unicast transmissions of unicast data packets by selected network devices (at respective allocated frequency channels), and a second subset of the fixed-length timeslots are allocated for broadcast/multicast transmission of broadcast/unicast data packets to multiple neighboring network devices at a selected broadcast frequency channel.

A problem with deploying unicast and broadcast schedules within a time slotted channel hopping schedule is that instances can arise where heavy unicast traffic throughput coincides with low multicast traffic throughput (e.g., if a network device sends data bursts of a data "torrent"), or heavy broadcast traffic throughput coincides with low unicast traffic throughput (e.g., during distribution of data packets associated with firmware upgrades). Hence, the deployment of the unicast and broadcast schedules within a time slotted channel hopping schedule can result in under-utilization of first schedules encountering low traffic throughput at the same time generally that congestion is encountered on second schedules encountering heavy traffic throughput.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
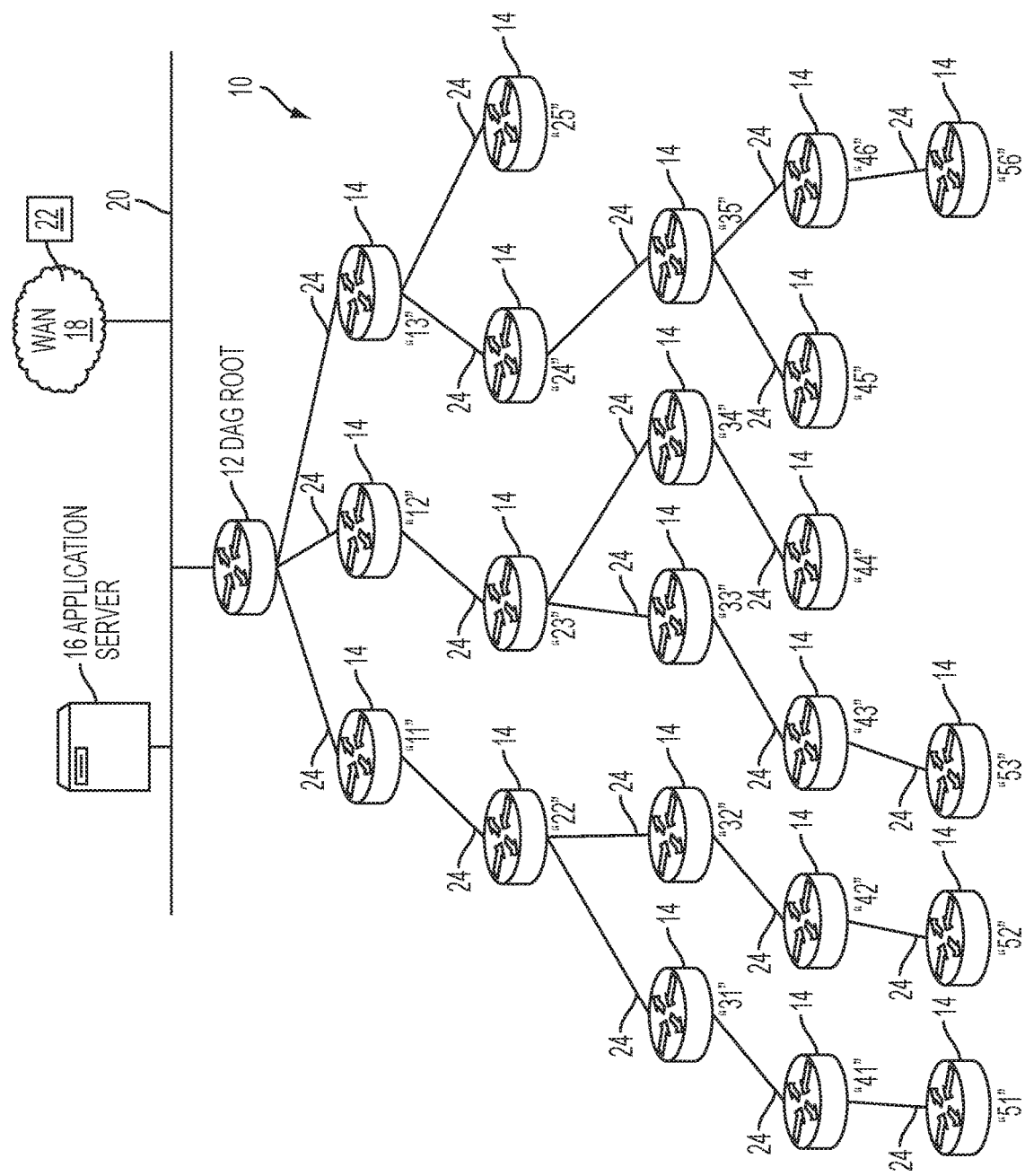
FIG. 1 illustrates an example wireless data network having an apparatus for predicting a predicted throughput of a future broadcast transmission interval, and selectively adjusting a corresponding prescribed duration of the future broadcast transmission interval based on the predicted throughput, according to an example embodiment.

In one embodiment, a method comprises: determining, by a network device in a wireless data network, a past throughput of broadcast data packets transmitted at broadcast transmission intervals of a prescribed broadcast schedule over a selected measurement interval, the broadcast transmission intervals each adjacent to unicast transmission intervals allocated in the wireless data network, each of the broadcast transmission intervals in the prescribed broadcast schedule initially set at a prescribed duration; predicting, by the network device, a predicted throughput of a future broadcast transmission interval of the prescribed broadcast schedule, for transmission of at least a future broadcast data packet and reception of at least one future second broadcast data packet, based on executing a trendline prediction of the predicted throughput using the past throughput over the selected measurement interval; and adjusting, by the network device, the corresponding prescribed duration of the future broadcast transmission interval, relative to the corresponding adjacent unicast transmission interval following the future broadcast transmission interval, based on the predicted throughput.

In another embodiment, an apparatus comprises non-transitory machine readable media configured for storing executable machine readable code; a device interface circuit; and a processor circuit. The device interface circuit is configured for sending and receiving data packets in a wireless data network. The apparatus implemented as a network device in the wireless data network. The processor circuit is configured for executing the machine readable code, and when executing the machine readable code operable for: determining a past throughput of broadcast data packets transmitted at broadcast transmission intervals of a prescribed broadcast schedule over a selected measurement interval, the broadcast transmission intervals each adjacent to unicast transmission intervals allocated in the wireless data network, each of the broadcast transmission intervals in the prescribed broadcast schedule initially set at a prescribed duration; predicting a predicted throughput of a future broadcast transmission interval of the prescribed broadcast schedule, for transmission of at least a future broadcast data packet and reception of at least one future second broadcast data packet, based on executing a trendline prediction of the predicted throughput using the past throughput over the selected measurement interval, and adjusting the corresponding prescribed duration of the future broadcast transmission interval, relative to the corresponding adjacent unicast transmission interval following the future broadcast transmission interval, based on the predicted throughput.

In another embodiment, or more non-transitory tangible media encoded with logic for execution by a machine and when executed by the machine operable for: determining, by the machine implemented as a network device in a wireless data network, a past throughput of broadcast data packets transmitted at broadcast transmission intervals of a pre-scribed broadcast schedule over a selected measurement interval, the broadcast transmission intervals each adjacent to unicast transmission intervals allocated in the wireless data network, each of the broadcast transmission intervals in the prescribed broadcast schedule initially set at a prescribed duration; predicting a predicted throughput of a future broadcast transmission interval of the prescribed broadcast schedule, for transmission of at least a future broadcast data packet and reception of at least one future second broadcast data packet, based on executing a trendline prediction of the predicted throughput using the past throughput over the selected measurement interval; and adjusting the corresponding prescribed duration of the future broadcast transmission interval, relative to the corresponding adjacent unicast transmission interval following the future broadcast transmission interval, based on the predicted throughput.

Detailed Description

Particular embodiments enable a network device in a wireless data network (e.g., a personal area network (PAN) or FAN implemented as a CG-mesh) to predict a future throughput (i.e., a "predicted throughput") of a future broadcast transmission interval in a wireless data network utilizing a time slotted channel hopping schedule for implementation of unicast transmission intervals and broadcast intervals. The particular embodiments enable the network device to predict the future throughput of the future broadcast transmission interval based on trendline prediction using a determined past throughput of broadcast data packets transmitted at prior broadcast transmission intervals over a selected measurement interval.

A given broadcast transmission interval can include a first broadcast data packet transmitted by the network device, and a second broadcast data packet that is broadcast by a neighboring network device (e.g., a parent network device or child network device in a tree-based topology) and received by the network device; hence, the past throughput used to determine the trendline prediction can include both first broadcast data packets that were broadcast by the network device, and second broadcast data packets that were received by the network device.

Hence, the example embodiments enable the network device to determine the predicted throughput not only for its own broadcast data packet(s) awaiting transmission at the future (e.g., "next") broadcast transmission interval, but also for expected broadcast data packet(s) that are predicted to be received from one or more neighboring network devices within the same future broadcast transmission interval.

Consequently, the example embodiments enable the network device to adjust a corresponding prescribed duration of the future broadcast transmission interval, relative to the adjacent unicast transmission interval following the future broadcast interval, in order to accommodate the predicted throughput. For example, the network device can broadcast transmit to neighboring network devices, at initiation of the broadcast transmission interval, an adjustment request specifying a reduction in the future broadcast interval to accommodate heavy unicast traffic throughput coinciding with a predicted low multicast traffic throughput; alternately, the adjustment request can specify an increase in the future broadcast transmission interval to accommodate a predicted heavy broadcast traffic throughput that coincides with low unicast traffic throughput (e.g., during distribution of data packets associated with firmware upgrades).

Hence, example embodiments can accommodate changes between throughput requirements in the unicast traffic transmission intervals and broadcast traffic transmission intervals based on adjusting future broadcast transmission intervals based on the predicted throughput.

A description will first be provided of the wireless data network utilizing a time slotted channel hopping schedule comprising initially fixed unicast slots (i.e., unicast transmission intervals) and initially fixed broadcast/multicast slots (i.e., broadcast/unicast transmission intervals), followed by a description of the dynamic adjustment of future broadcast transmission intervals based on predicted throughput.

FIG. 1 illustrates an example wireless mesh data network 10, for example an IEEE 802.15.4e/g based CG-mesh network having a wireless mesh network device 12 operating as a directed acyclic graph (DAG) root for multiple wireless mesh network devices 14, operating for example as RPL nodes according to RFC 6550, according to an example embodiment. The DAG root 12 can serve as a "sink" for the mesh network devices 14, for example for reaching a server device 16 and/or a wide area network (WAN) (e.g., the Internet) 18 via a backbone link 20 (e.g., for reaching a remote network device 22 reachable via the WAN 18).

The DAG root 12 can be configured for causing creation of a tree-based topology overlying the link layer mesh data network 10 based on transmitting one or more DODAG information object (DIO) messages. The wireless mesh data network 10 can be implemented as a Low-power and Lossy Network (LLN) that can include dozens or thousands of low-power wireless mesh network devices 14 each configured for routing data packets according to a routing protocol designed for such low power and lossy networks, for example RPL: such low-power router devices can be referred to as "RPL nodes"; hence, a wireless mesh network device 14 also can be referred to herein as a "RPL node" or a wireless network device. Each RPL node 14 in the LLN typically is constrained by processing power, memory, and energy (e.g., battery power); interconnecting wireless data links 24 between the RPL nodes 14 typically are constrained by high loss rates, low data rates, and instability with relatively low packet delivery rates.

A network topology (e.g., a "RPL instance" according to RFC 6550) can be established based on creating routes toward a single "root" network device (e.g., a backbone router) 12 in the form of a directed acyclic graph (DAG) toward the DAG root 12, where all routes in the LLN terminate at the DAG root 12 (also referred to as a "DAG destination"). Hence, the DAG also is referred to as a Destination Oriented DAG (DODAG). Network traffic can move either "up" towards the DODAG root 12 or "down" towards the DODAG leaf nodes (e.g., nodes "51", "52", "53", "44", "45", "56").

The DODAG can be formed based on a DODAG information object (DIO) advertised by the DAG root 12, where a "child" network device (e.g., "11", "12", and/or "13") 14 detecting the DIO can select the DAG root 12 as a parent in the identified DODAG based on comparing network topology metrics (advertised in the DIO) to a prescribed objective function of the RPL instance. The "child" network device 14, upon attaching to its parent, can output its own DIO with updated network topology metrics that enable other wireless mesh network devices 14 to discover the DODAG, learn the updated network topology metrics, and select a DODAG parent. As described in further detail below, the example embodiments enables any one of the network devices 12, 14, to dynamically adjust a prescribed duration of a future broadcast transmission interval to accommodate broadcast transmissions of DIO and/or DAO messages during network formation, recovery after a local or regional power loss, etc.

A single instance of the DODAG or DAG also is referred to as a Personal Area Network (PAN). Hence, a wireless mesh data network 10 can include a plurality of PANs (not shown in FIG. 1), where each PAN includes one DAG root 12 (exclusively allocated to the PAN) and multiple wireless mesh network devices 14 connected exclusively within the PAN according to the DIO messages originated by the corresponding one DAG root 12. Hence, unless explicitly stated otherwise herein, a wireless mesh network device 14 is configured to belong to only one PAN at a time, i.e., a wireless mesh network device 14 is configured to be attached only within one DODAG, although the wireless mesh network device 14 can be configured for attachment to one or more parent network devices 14 within a single DODAG.

Downward routes (i.e., away from the DAG root) can be created based on Destination Advertisement Object (DAO) messages that are created by a wireless mesh network device 14 and propagated toward the DAG root 12. The RPL instance can implement downward routes in the DAG of the LLN in either a storing mode only (fully stateful), or a non-storing mode only (fully source routed by the DAG root), or a combination thereof (e.g., some parent network devices operate in storing mode and one or more child network devices operate in non-storing mode only). In storing mode, a RPL node unicasts its DAO message to its parent node, such that RPL nodes can store downward routing tables for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

Each mesh network device 14 in the wireless mesh data network 10 can be configured for operating in storing mode, non-storing mode, and/or a combination thereof. Hence, each wireless mesh network device 14 can unicast transmit its DAO message to its parent (and/or the DAG root 12) in accordance with RFC 6550. The DAG root 12, in response to receiving the DAO messages from the RPL nodes 14, can build the entire DAG topology and store the DAG topology in its memory circuit 34 (illustrated in FIG. 2), including storage of heuristics of usage, path length, knowledge of device capacity, link reliability, etc.

A wireless mesh network device 14 can operate as a parent network device (e.g., "22" of FIG. 1) for an attached "child" RPL node (e.g., "31"). For example, in response to a parent network device "41" receiving a data packet originated by its child network device "51" 14, the parent network device "41" can cache a downward path (i.e., away from the DAG root 12) that the target device "51" 14 is reachable via a given egress interface on the parent device "41" (e.g., output to an IPv6 address "41::51" that is the attachment address of the target device "51"); the next parent network device "31", in response to receiving the data packet from its child RPL node "41", can cache the downward path that the target device "51" 14 is reachable via the child RPL node "41"; the next parent network device "22", in response to receiving the data packet from its child RPL node "31", can cache the downward path that the target device "51" 14 is reachable via the child RPL node "31"; and the next parent network device "11", in response to receiving the data packet from its child RPL node "22", can cache the downward path that the target device "51" 14 is reachable via the child RPL node "22".

Hence, each of the parent network devices "41", "31", "22", and "11" 14 can execute a caching (e.g., a transient caching on a temporary basis) of a downward path (i.e., away from the DAG root 12) for reaching the target network device "51" 14, independent of any route table entry in the parent network device; moreover, a common parent device (e.g., "22") 14 can cache downward paths toward multiple "target devices" (e.g., network devices "51" and "52") within its sub-DAG, such that a data packet originated by one RPL node "51" and destined toward another RPL node "52" can be forwarded by the common parent device (e.g., "22") to the corresponding parent device "32" of the destination target "52" eliminating the necessity that the data packet be forwarded via the default route toward the DAG root 12.

Figure 2:
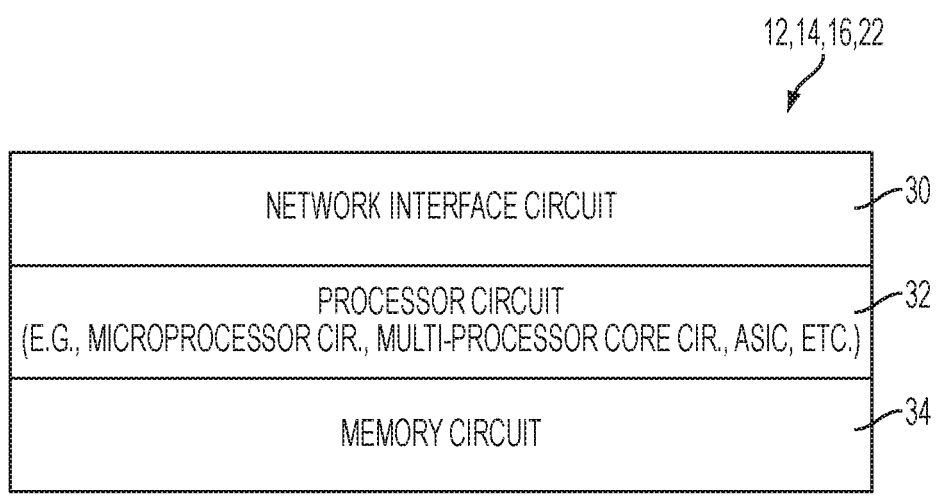
FIG. 2 illustrates an example implementation of any one of the devices of FIG. 1, according to an example embodiment.

FIG. 2 illustrates an example implementation of any one of the devices 12, 14, 16, and/or 22 of FIG. 1, according to an example embodiment. Each device 12, 14, 16, and/or 22 is a physical machine (i.e., a hardware device) configured for communications with any other device 12, 14, 16, and/or 22.

Each apparatus 12, 14, 16, and/or 22 can include a device interface circuit 30, a processor circuit 32, and a memory circuit 34. The device interface circuit 30 can include one or more distinct physical layer transceivers for communication with any one of the other devices 12, 14, 16, and/or 22; the device interface circuit 30 also can include an IEEE based Ethernet transceiver for communications with the devices of FIG. 1 via any type of data link (e.g., a wired or wireless link, an optical link, etc.), for example a wireless IEEE 802.15.4e/g data link. The processor circuit 32 can be configured for executing any of the operations described herein, and the memory circuit 34 can be configured for storing any data or data packets as described herein. The term "configured for" or "configured to" as used herein with respect to a specified operation refers to a device and/or machine that is physically constructed and arranged to perform the specified operation.

Any of the disclosed circuits of the devices 12, 14, 16, and/or 22 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
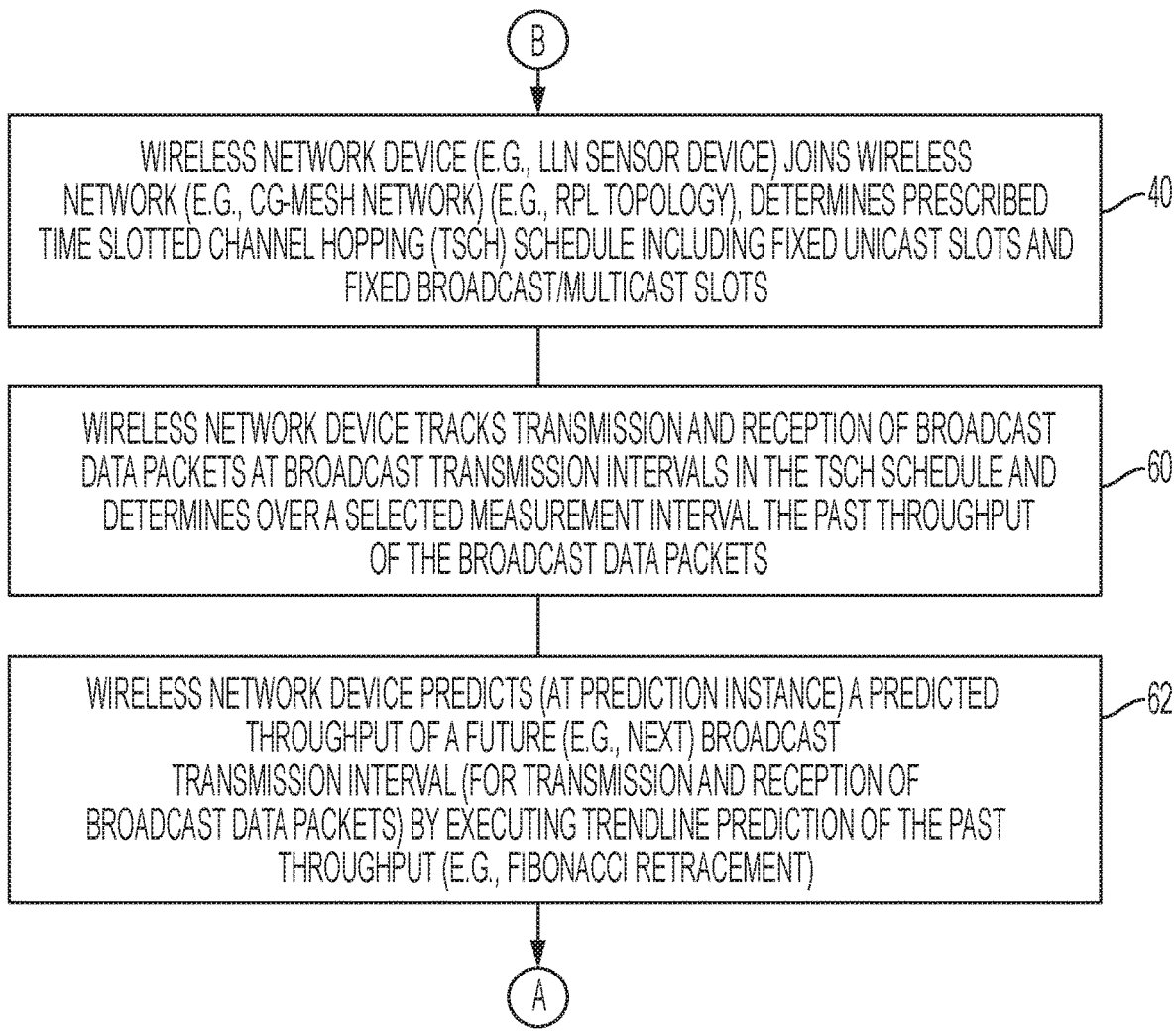
FIGS. 3A-3C illustrate an example method of predicting a predicted throughput of a future broadcast transmission interval, and selectively adjusting a corresponding prescribed duration of the future broadcast transmission interval based on the predicted throughput, according to an example embodiment.
Figure 3B:
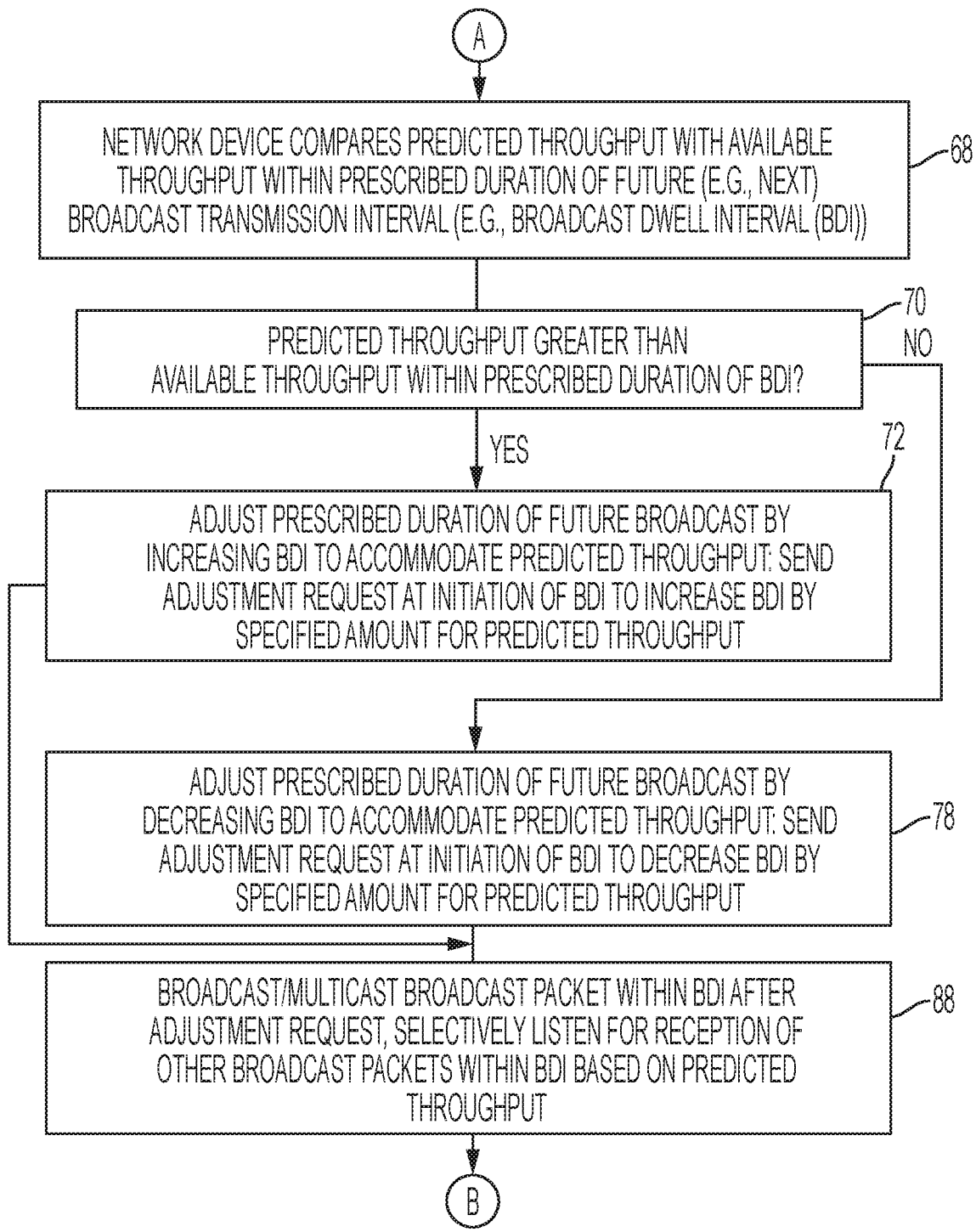
Figure 3C:
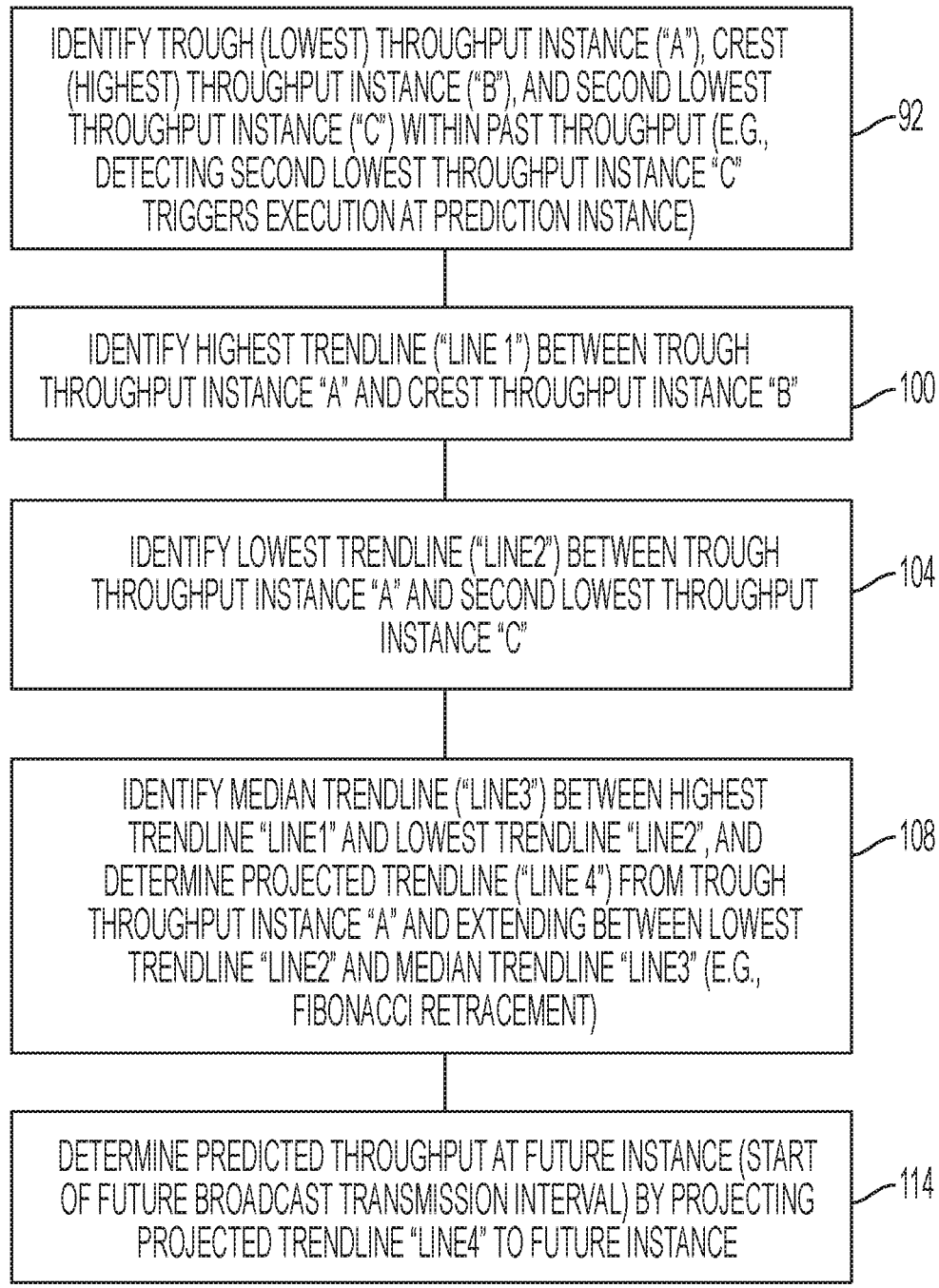

FIGS. 3A-3C illustrate an example method of predicting a predicted throughput of a future broadcast transmission interval, and selectively adjusting a corresponding prescribed duration of the future broadcast transmission interval based on the predicted throughput, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 3A, the processor circuit 32 of the DAG root 12 and/or each wireless mesh network device 14 can be configured for joining in operation 40 the wireless mesh data network 10. Each wireless mesh network device 14 can join the wireless mesh data network 10 based on detecting the DIO messages broadcast by the DAG root 12, and determining a prescribed time slotted channel hopping (TSCH) schedule (42 of FIG. 4) for transmission and reception of data packets in the wireless mesh data network 10.

Figure 4:
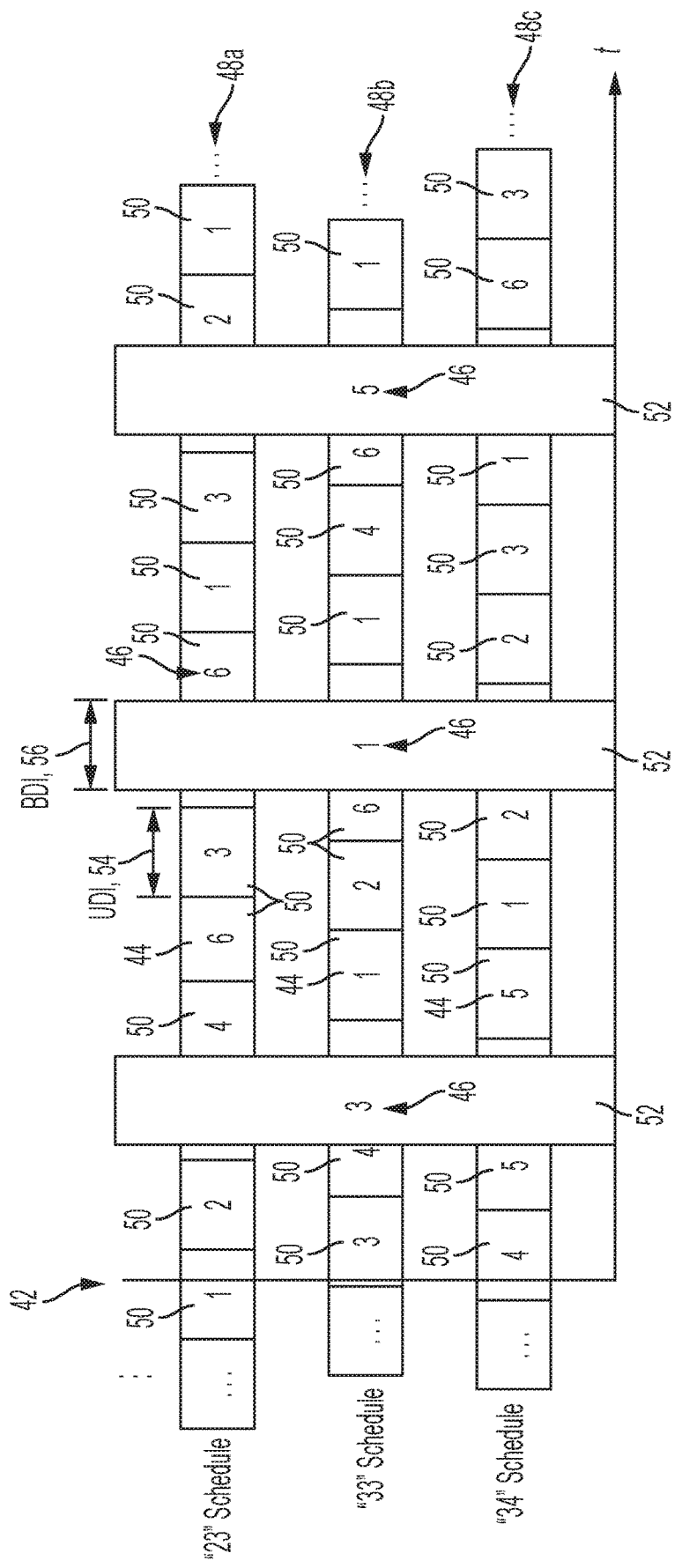
FIG. 4 illustrates an example time slotted channel hopping schedule implemented in the wireless data network of FIG. 1 and comprising fixed unicast slots and fixed broadcast/multicast slots, according to an example embodiment.

FIG. 4 illustrates an example time slotted channel hopping (TSCH) schedule 42 implemented in the wireless data network 10, according to an example embodiment. The TSCH schedule 42 as illustrated in FIG. 4 can be established, for example, by a central controller such as a path computation element (PCE) implemented in the server device 16, and/or the remote network device 22; the TSCH schedule 42 also can be provided by the DAG root 12 and/or a parent network device in the RPL topology (e.g., "23" of FIG. 1) allocating a "chunk" of available frequency hopping schedules to child network devices (e.g., "33", "34" of FIG. 1) joining the wireless mesh data network 10.

The TSCH schedule 42 can encompass a prescribed number of frequency channel offsets (e.g., sixteen (16)) over timeslots (i.e., transmission intervals) 44 that are initially set to a fixed prescribed duration (e.g., one hundred twenty five milliseconds (125 ms)): in one embodiment, the timeslots 44 can be identified by timeslot offsets (e.g., an Absolute Slot Number (ASN)) relative to an epochal start of time. Each frequency channel is illustrated in each timeslot 44 by a corresponding frequency channel identifier 46, illustrated in FIG. 4 as frequency channel identifier values "1" through "6".

As illustrated in FIG. 4, each wireless mesh network device 14 is allocated a corresponding device-specific TSCH schedule 48 from the TSCH schedule 42: for example, the wireless mesh network device "23" 14 of FIG. 1 can be allocated the device-specific TSCH schedule 48a (e.g., by its parent network device "12" and/or a PCE); the wireless mesh network device "33" 14 of FIG. 1 (attached to the wireless mesh data network 10 as a child of the wireless mesh network device "23" 14) can be allocated the device-specific TSCH schedule 48b (e.g., by its parent network device "23" and/or a PCE); and the wireless mesh network device "34" 14 of FIG. 1 (attached to the wireless mesh data network 10 as a child of the wireless mesh network device "23" 14) can be allocated the device-specific TSCH schedule 48c (e.g., by its parent network device "23" and/or a PCE).

Figure 5:
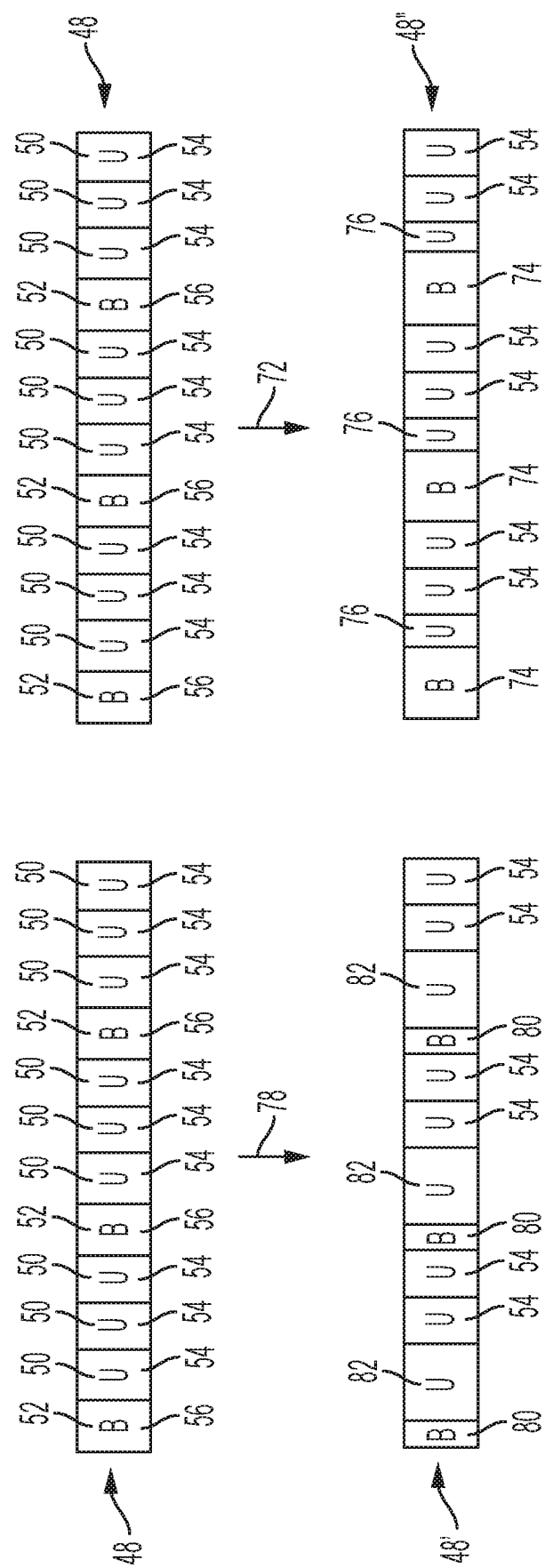
FIGS. 5A and 5B illustrate example adjustment of a prescribed duration of a broadcast transmission interval based on reducing the corresponding duration or increasing the prescribed duration, respectively, according to an example embodiment.

The processor circuit 32 of each wireless mesh network device 14 in operation 40 also can identify, from the timeslots 44 within its corresponding device-specific TSCH schedule 48, unicast transmission intervals 50 and broadcast transmission intervals 52, for example based on prescribed ratio of unicast transmission intervals 50 for each broadcast transmission interval 52 (e.g., 3:1 ratio as illustrated in FIGS. 4 and 5). Each unicast transmission interval 50 has a corresponding prescribed duration (also referred to as a unicast dwell interval (UDI)) 54 that is initially set, and each broadcast transmission interval 52 has a corresponding prescribed duration (also referred to as a broadcast dwell interval (BDI)) 56 that is initially set: the UDI 54 and the BDI 56 in FIG. 4 can each be set to equal the same time value (e.g., 125 ms), or different respective time values. The time interval between two broadcast transmission intervals 52 is referred to as a "broadcast interval" (BI).

As illustrated in FIG. 4, each of the device-specific TSCH schedules 48 may not be exactly aligned relative to each other based on relative clock drift, etc. However, the initiation of each broadcast transmission interval 52 can be precisely defined based on a network device initiation transmission of a broadcast data packet upon initiation of its own relative broadcast transmission interval 52, for example based on determining there is no other carrier sense indicating a data packet transmission: each of the neighboring wireless mesh network devices 14 can respond to the initiated transmission of the broadcast data packet by setting a timer indicating initiation of the broadcast transmission interval 52, described below.

In response to determining its corresponding device-specific TSCH schedule 48 (relative to the TSCH schedule 42), the processor circuit 32 of each wireless mesh network device 14 can track in operation 60 the transmission and reception of broadcast data packets at different broadcast transmission intervals 52. In particular, for a given broadcast transmission interval 52 a wireless mesh network device (e.g., "23" of FIG. 1) 14 can transmit a broadcast data packet (i.e., a "first broadcast data packet") and also can receive a broadcasted data packet (i.e., "second broadcast data packet") that is broadcast transmitted by a neighboring network device (e.g., a child network device "33"). Hence, although a wireless mesh network device (e.g., "23") 14 is able to determine from its transmit queue the corresponding size of a "first broadcast data packet" scheduled by the wireless mesh network device (e.g., "23") 14 to be transmitted at the next broadcast transmission interval 52, the wireless mesh network device (e.g., "23") 14 is incapable of identifying precisely if a neighboring network device (e.g., parent network device "12", or child network devices "33" or "34") also will have second broadcast data packets intended for transmission at the next broadcast transmission interval 52. Hence, there is a concern that use of the BDI 56 at its initially-set prescribed duration can result in congestion during instances where a large amount of broadcast traffic is introduced into the wireless mesh data network 10, for example in response to network reformation/recovery after a power outage notification (PON), in response to distribution of firmware updates (introduced, for example, by the server device 16, etc.).

Figure 6:
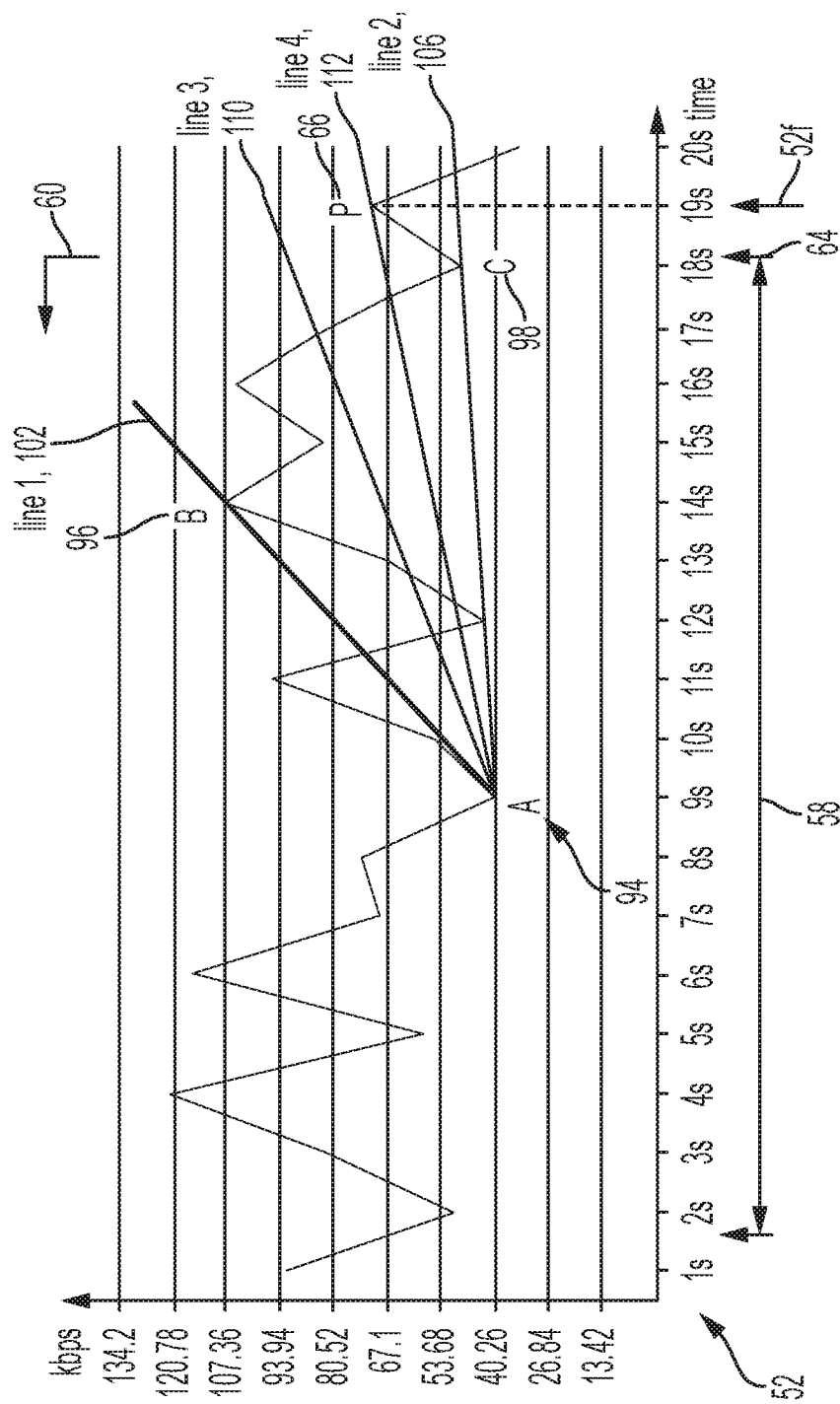
FIG. 6 illustrates an example trendline prediction of the predicted throughput based on the past throughput of broadcast data packets over a selected measurement interval, according to an example embodiment.

Hence, as illustrated in FIG. 6, the processor circuit 32 of each wireless mesh network device 14 determines in operation 60 the past throughput 60 of data packets transmitted at prior broadcast transmission intervals 52 based on tracking the transmission and reception of broadcast data packets at the broadcast transmission intervals 52 over a selected measurement interval (58 of FIG. 6). Each broadcast transmission interval 52 is illustrated for simplicity as being initiated every "tick" of one second, such that processor circuit 32 can store in its memory circuit 34 a data structure identifying the respective throughput values of broadcast data packets transmitted at the broadcast transmission intervals "1 s" through "18 s" within the selected measurement interval 58 (e.g., 93 kbps at "1 s", 53 kbps at "2 s", 80 kbps at "3 s", 121 kbps at "4 s", etc.). As described below, the processor circuit 32 can maintain in its memory circuit 34 a data structure that stores the past throughput 60 as a "sliding window", based on a selected size of the selected measurement interval 58, until detection of a "second lowest throughput" instance ("C" in FIG. 6) that can initiate (i.e., "trigger") execution of the prediction operation 62 at a prediction instance 64.

As illustrated in FIG. 3A and FIG. 6, the processor circuit 32 of a wireless mesh network device 14 at a determined prediction instance 64 (described below) can initiate execution of operation 62 that uses the past throughput 60 of broadcast data packets to determine a predicted throughput "P" (e.g., in kilobits per second (kbps)) 66 of a future broadcast transmission interval measured, for example in milliseconds (e.g., 52f of FIG. 6). As described in detail below with respect to FIG. 3C, the processor circuit 32 of a wireless mesh network device (e.g., "23") 14 can predict a predicted throughput "P" 66 for the future broadcast transmission interval 52f, for transmission of at least a future broadcast data packet (transmitted by the wireless mesh network device "23") and reception of at least one future second broadcast data packet (received from another neighboring transmitting wireless mesh network device 14) based on executing a trendline prediction of the predicted throughput using the past throughput 60 that was determined over the selected measurement interval 58.

Figure 7A:
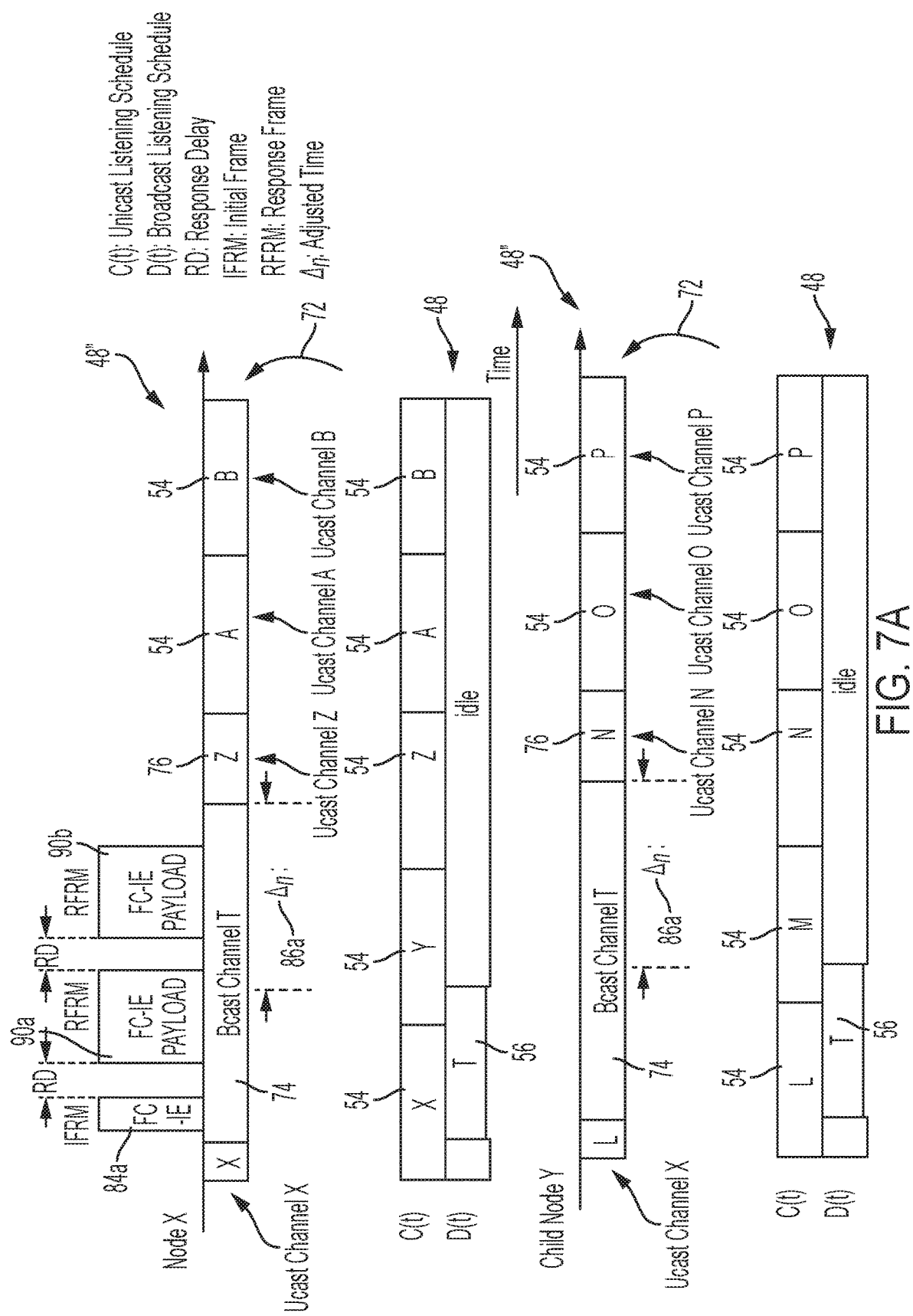
FIGS. 7A and 7B illustrate example adjustment of a prescribed duration of a broadcast transmission interval relative to an adjacent unicast transmission interval based on increasing the corresponding duration or decreasing the prescribed duration, respectively, according to an example embodiment.

Referring to FIG. 3B, the processor circuit 32 of the wireless mesh network device (e.g., "23") 14 in operation 68 can compare the predicted throughput "P" 66 with the currently-available throughput within prescribed duration of the future (e.g., next) broadcast transmission interval, for example the prescribed BDI 56 of the future broadcast transmission interval 52f. If in operation 70 the processor circuit 32 of the wireless mesh network device (e.g., "23") 14 determines the predicted throughput "P" 66 is greater than the available throughput within the prescribed duration of the future (e.g., next) broadcast transmission interval (e.g., the prescribed BDI 56 within the future broadcast transmission interval 52f), the processor circuit 32 of the wireless mesh network device (e.g., "23") 14 can execute operation 72 to increase the BDI 56 to an increased broadcast transmission interval (i.e., increased broadcast dwell interval (I_BDI)) 74 having an adjusted duration to accommodate the predicted throughput "P" 66 based on reducing an adjacent unicast transmission interval 50 to a reduced unicast dwell interval (R_UDI) 76. As illustrated in FIG. 5B and FIG. 7A, the processor circuit 32 of the wireless mesh network device (e.g., "23") 14 can increase in operation 72 the BDI 56 to the increased broadcast dwell interval (I_BDI)

74 based on causing the device interface circuit 30 to output, at initiation of the future broadcast transmission interval 52f, an adjustment request 84a (i.e., a BDI increase request 84a) requesting an increase of the BDI 56 by a specified "delta" increase ($\Delta_n$) 86a, resulting in a modified device-specific TSCH schedule 48" providing the increased broadcast dwell interval (I_BDI) 74 (in place of the BDI 56) and the adjacent reduced unicast dwell interval (R_UDI) 76 (in place of the UDI 54). As apparent from FIG. 7A, a neighboring network device (e.g., child "Y") can respond to the BDI increase request 84a and generate the modified device-specific TSCH schedule 48".

Figure 7B:
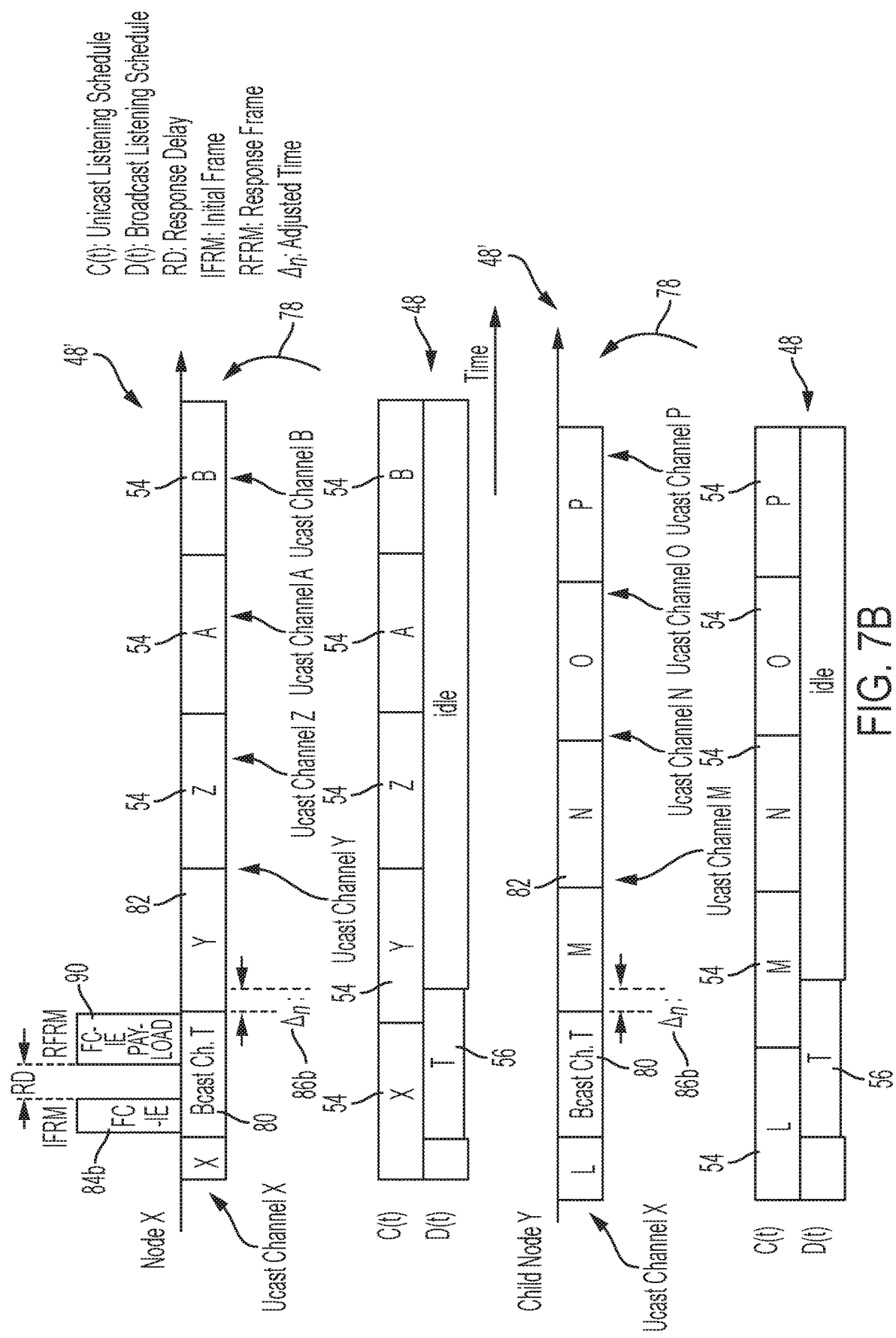

If in operation 70 the processor circuit 32 of the wireless mesh network device (e.g., "23") 14 determines the predicted throughput "P" 66 is less than the available throughput within the prescribed duration of the future (e.g., next) broadcast transmission interval (e.g., the prescribed BDI 56 within the future broadcast transmission interval 52f), the processor circuit 32 of the wireless mesh network device (e.g., "23") 14 can execute operation 78 to decrease the BDI 56 to a decreased broadcast transmission interval (i.e., decreased broadcast dwell interval (D_BDI)) 80 having an adjusted duration to accommodate an increase in unicast throughput based on increasing an adjacent unicast transmission interval 50 to an increased unicast dwell interval (I_UDI) 82. As illustrated in FIG. 5A and FIG. 7B, the processor circuit 32 of the wireless mesh network device (e.g., "23") 14 can cause the device interface circuit 30 to output, at initiation of the future broadcast transmission interval 52f, an adjustment request 84b (i.e., a BDI decrease request 84b) to decrease the BDI 56 by a specified "delta" decrease ($\theta_n$) 86b to the decreased broadcast dwell interval (D_BDI) 80, resulting in a modified device-specific TSCH schedule 48' providing the decreased broadcast dwell interval (D_BDI) 80 (in place of the BDI 56) and the adjacent increased unicast dwell interval (I_UDI) 82 (in place of the UDI 54). As apparent from FIG. 7B, a neighboring network device (e.g., child "Y") can respond to the BDI decrease request 84b and generate the modified device-specific TSCH schedule 48". As illustrated in FIG. 7B, the unicast channel "Y" for node "X" and the unicast channel "M" for child node "Y" is allocated in operation 78, for the increased unicast dwell interval (I_UDI) 82, the additional specified "delta" decrease (θn) 86b that otherwise would not be available if the BDI 56 was maintained.

Hence, the processor circuit 32 of the wireless mesh network device (e.g., "23") 14 (and/or a neighboring network device) in operation 88 can output during the future broadcast transmission interval 52f, following the adjustment request 84, a broadcast data packet (90a and/or 90b of FIG. 7A; 90 of FIG. 7B) during the adjusted broadcast dwell interval, for example the increased broadcast dwell interval (I_BDI) 74 of FIG. 7A, or the decreased broadcast dwell interval (D_BDI) 80 of FIG. 7B. As illustrated in FIGS. 7A and 7B, neighboring network devices within the same broadcast domain (e.g., using broadcast channel "T") can contend for the adjusted dwell interval after a prescribed response delay "RD" (e.g., according to a prescribed link layer delay interval following transmission of each broadcast data packet).

Hence, FIG. 7A illustrates that the wireless mesh network device (e.g., "23") 14 can broadcast a "future" broadcast data packet 90a after the BDI increase request 84a, and receive a "future second" broadcast data packet 90b within the same increased broadcast dwell interval (I_BDI) 74: the wireless mesh network device (e.g., "23") 14 can generate in operation 78 the BDI increase request 84a (requesting increase of the dwell interval, of the future broadcast transmission interval 52f, from the BDI 56 by the specified "delta" increase ($\theta_n$) 86a to the increased broadcast dwell interval (I_BDI) 74), and output in operation 78 the BDI increase request 84a at initiation of the future broadcast transmission interval 52f; the wireless mesh network device (e.g., "23") 14 in operation 88 also can broadcast transmit, following the BDI increase request 84a, a future broadcast data packet 90a within the increased broadcast dwell interval (I_BDI) 74; the wireless mesh network device (e.g., "23") 14 in operation 88 also can receive, from a neighboring network device (e.g., child network device "33"), a future second broadcast data packet 90b within the increased broadcast dwell interval (I_BDI) 74.

FIG. 3C illustrates additional example operations that can be implemented for execution of operation 62 of FIG. 3A. As described previously, the processor circuit 32 of a wireless mesh network device (e.g., "23") 14 can store in the memory circuit 34 a data structure that identifies the past throughput 60 of transmitted and received broadcast data packets at each of the broadcast transmission intervals 52 within the selected measurement interval 58. The processor circuit 32 of the wireless mesh network device (e.g., "23") 14 in operation 92 can identify, from the past throughput 60, a trough throughput instance "A" 94 as the lowest throughput in the past throughput 60 of broadcast transmissions over the selected measurement interval 58. The processor circuit 32 of the wireless mesh network device (e.g., "23") 14 in operation 92 also can identify, from the past throughput 60, a crest throughput instance "B" 96 identifying the highest throughput following the adjustment request 84. The processor circuit 32 of the wireless mesh network device (e.g., "23") 14 in operation 92 also can identify, from the past throughput 60, a second lowest throughput instance "C" 98 identifying the second-lowest throughput of the past throughput 60 following the crest throughput instance "B" 96.

For example, the processor circuit 32 can determine the instances 94, 96, and 98 based on the processor circuit 32 comparing past relative peaks. For example, the processor circuit 32 can determine the throughput at the broadcast transmission interval "1 s" is 93 kbs and therefore can set "93 kbps" as the highest relative crest point; the processor circuit 32 can then determine the throughput at the broadcast transmission interval "2 s" is 53 kbs and therefore can set "53 kbps" as the lowest relative trough point; the processor circuit 32 can then determine the throughput at the broadcast transmission interval "4 s" is 121 kbs and therefore can set "121 kbps" as the highest relative crest point following the lowest relative trough point of "53 kbps". The processor circuit 32 can then determine the throughput at the broadcast transmission interval "9 s" is 40 kbs and therefore can set "40 kbps" as the trough throughput instance "A" 94. Hence, the processor circuit 32 can determine the crest throughput instance "B" 96 following the trough throughput instance "A" 94 at the broadcast transmission interval "9 s" (e.g., at "14 s"), and the processor circuit 32 can determine the second lowest throughput instance "C" 98 following the crest throughput instance "B" 96 (e.g., at "18 s").

The detection of the second lowest throughput instance "C" 98 in operation 92 can trigger execution of prediction operations at the prediction instance 64 where the processor circuit 32 of the wireless mesh network device (e.g., "23") 14 in operation 100 can initiate execution of Fibonacci retracement to determine the predicted throughput "P" 66. For example, the processor circuit 32 of the wireless mesh network device (e.g., "23") 14 in operation 100 can identify a highest trendline ("line 1") 102 between the trough throughput instance "A" 94 and the crest throughput instance "B" 96. The processor circuit 32 of the wireless mesh network device (e.g., "23") 14 in operation 104 can identify a lowest trendline ("line 2") 106 between the trough throughput instance "A" 94 and the second lowest throughput instance "C" 98. It will be apparent that the highest trendline ("line 1") 102 corresponds to a first Fibonacci trendline (38.2%), and the lowest trendline ("line 2") 106 corresponds to a second Fibonacci trendline (61.8%).

The processor circuit 32 of the wireless mesh network device (e.g., "23") 14 in operation 108 also can identify a median trendline ("line 3") 110 between the highest trendline ("line 1") 102 and the lowest trendline ("line 2") 106, also referred to as a "Gann" level of 50%. Hence, the processor circuit 32 of the wireless mesh network device (e.g., "23") 14 in operation 108 can determine a projected trendline ("line 4") 112 (as a Fibonacci retracement) from the trough throughput instance "A" 94 and extending between the lowest trendline ("line 2") 106 and the median trendline ("line 3") 110 (that is between highest trendline ("line 1") 102 and the lowest trendline ("line 2") 106). By way of further illustration, assume the trough throughput instance "A" 94 is represented in FIG. 6 by the X-Y coordinates $(x_a, y_a)$ (e.g., A(9, 40)), the crest throughput instance "B" 96 is represented in FIG. 6 by the X-Y coordinates $(x_b, y_b)$ (e.g., B(14, 105)), and the second lowest throughput instance "C" 98 is represented in FIG. 6 by the X-Y coordinates $(x_c, y_c)$ (e.g., C(18, 49)). Hence, the average data rate "$k_n$" for a broadcast timeslot "n" 52 (representing the "slope" of the projected trendline ("line 4") 112) can be determined by the processor circuit 32 in Equation (1), and the predicted throughput "P" 66 can be determined by the processor circuit 32 as an estimated data rate (ED(n)) in Equation (2):

$$k_n = \frac{1}{4}\left(\frac{y_b - y_a}{x_b - x_a} - \frac{y_c - y_a}{x_c - x_a}\right) \quad (1)$$

$$ED(n) = y_n = k_n * x_n + (y_a - k_n * x_a) \quad (2)$$

Hence, the predicted throughput "P" 66 in operation 114 at the future broadcast transmission interval "n=19" 52*f* (i.e., "P=ED(19)") can be determined by the processor circuit 32 as illustrated in Equation 2, based on projecting the projected trendline ("line 4") 112 (using the "slope" of the projected trendline ("line 4") 112 "$k_n$") from the adjustment request 84 to the future broadcast transmission interval "n=19" 52*f*, resulting in the predicted throughput "P=ED (19)=70 kbps", or $(x_p, y_p)$ (e.g., P(19, 70)).

Hence, the processor circuit 32 of the wireless mesh network device (e.g., "23") 14 can apply the predicted throughput "P=ED(19)=70 kbps", or $(x_p, y_p)$ (e.g., P(19, 70)) to determine the "delta" change $(\theta_n)$ 86 that is required to adjust the BDI 56 in the future broadcast transmission interval 52*f* in operations 72 or 78.

According to example embodiments, the prescribed duration of a future broadcast transmission interval can be adjusted based on a predicted throughput of a future broadcast transmission interval based on trendline prediction based on past throughput of broadcast data packets. The adjustment of a future broadcast transmission interval, relative to adjacent unicast transmission intervals, can balance between varying traffic patterns among broadcast transmission intervals relative to unicast transmission intervals. The example embodiments also could be applied to other channel hopping techniques, for example 6TiSCH, for improved throughput among scheduled transmission intervals.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining, by a network device in a wireless data network, a past throughput of broadcast data packets transmitted at broadcast transmission intervals of a prescribed broadcast schedule over a selected measurement interval, the broadcast transmission intervals each adjacent to unicast transmission intervals allocated in the wireless data network, each of the broadcast transmission intervals in the prescribed broadcast schedule initially set at a prescribed duration;
   predicting, by the network device, a predicted throughput of a future broadcast transmission interval of the prescribed broadcast schedule, for transmission of at least a future broadcast data packet and reception of at least one future second broadcast data packet, based on executing a trendline prediction of the predicted throughput using the past throughput over the selected measurement interval; and
   adjusting, by the network device, the corresponding prescribed duration of the future broadcast transmission interval, relative to the corresponding adjacent unicast transmission interval following the future broadcast transmission interval, based on the predicted throughput;
   wherein the predicting includes:
   identifying, from the past throughput, a trough throughput instance, a crest throughput instance and following the trough throughput instance, and a second lowest throughput instance following the trough throughput instance,
   identifying a highest trendline between the trough throughput instance and the crest throughput instance,
   identifying a lowest trendline between the trough throughput instance and the second lowest throughput instance, and
   determining a projected trendline from the trough throughput instance and extending between the lowest trendline and a median trendline between the highest and lowest trendlines.

2. The method of claim 1, wherein the predicting is executed by the network device at a prediction instance, the predicted throughput including transmission of a future broadcast data packet that has not yet been received by the network device as of the prediction instance.

3. The method of claim 1, wherein the adjusting includes broadcasting, at initiation of the future broadcast transmission interval, an adjustment request specifying one of extending the future broadcast transmission interval to a corresponding adjusted duration beyond the corresponding prescribed duration, or reducing the future broadcast transmission interval a corresponding adjusted duration less than the corresponding prescribed duration.

4. The method of claim 3, wherein:
   the determining the past throughput of broadcast data packets is based on first broadcast data packets broadcast by the network device, and second broadcast data packets received by the network device;

the method further comprising the network device broadcasting the future broadcast data packet after the adjustment request and within the corresponding adjusted duration, and selectively listening within the adjusted duration for the at least one future second broadcast data packet based on the predicted throughput.

5. The method of claim 1, wherein the executing of the trendline prediction further includes determining the predicted throughput, at a future instance associated with initiation of the future broadcast transmission interval, based on a determined projection of the projected trendline from the trough throughput instance to the future instance.

6. The method of claim 1, wherein:
the projected trendline is determined based on executing Fibonacci retracement relative to the highest trendline and the lowest trendline;
the predicted throughput is predicted based on the projected trendline extending to initiation of the future broadcast transmission interval.

7. An apparatus implemented as a physical machine, the apparatus comprising:
non-transitory machine readable media configured for storing executable machine readable code;
a device interface circuit configured for sending and receiving data packets in a wireless data network, the apparatus implemented as a network device in the wireless data network; and
a processor circuit configured for executing the machine readable code, and when executing the machine readable code causing operations comprising:
determining a past throughput of broadcast data packets transmitted at broadcast transmission intervals of a prescribed broadcast schedule over a selected measurement interval, the broadcast transmission intervals each adjacent to unicast transmission intervals allocated in the wireless data network, each of the broadcast transmission intervals in the prescribed broadcast schedule initially set at a prescribed duration,
predicting a predicted throughput of a future broadcast transmission interval of the prescribed broadcast schedule, for transmission of at least a future broadcast data packet and reception of at least one future second broadcast data packet, based on executing a trendline prediction of the predicted throughput using the past throughput over the selected measurement interval, and
adjusting the corresponding prescribed duration of the future broadcast transmission interval, relative to the corresponding adjacent unicast transmission interval following the future broadcast transmission interval, based on the predicted throughput;
wherein the processor circuit is configured for executing the predicting based on:
identifying, from the past throughput, a trough throughput instance, a crest throughput instance and following the trough throughput instance, and a second lowest throughput instance following the trough throughput instance,
identifying a highest trendline between the trough throughput instance and the crest throughput instance,
identifying a lowest trendline between the trough throughput instance and the second lowest throughput instance, and
determining a projected trendline from the trough throughput instance and extending between the lowest trendline and a median trendline between the highest and lowest trendlines.

8. The apparatus of claim 7, wherein the processor circuit is configured for executing the predicting at a prediction instance, the predicted throughput including transmission of a future broadcast data packet that has not yet been received by the network device as of the prediction instance.

9. The apparatus of claim 7, wherein the processor circuit is configured for executing the adjusting based on broadcasting, at initiation of the future broadcast transmission interval, an adjustment request specifying one of extending the future broadcast transmission interval to a corresponding adjusted duration beyond the corresponding prescribed duration, or reducing the future broadcast transmission interval a corresponding adjusted duration less than the corresponding prescribed duration.

10. The apparatus of claim 9, wherein:
the processor circuit is configured for determining the past throughput of broadcast data packets based on first broadcast data packets broadcast by the network device, and second broadcast data packets received by the network device;
the processor circuit is configured for causing the device interface circuit to broadcast the future broadcast data packet after the adjustment request and within the corresponding adjusted duration, and selectively listen within the adjusted duration for the at least one future second broadcast data packet based on the predicted throughput.

11. The apparatus of claim 7, wherein the processor circuit is configured for executing the trendline prediction based on determining the predicted throughput, at a future instance associated with initiation of the future broadcast transmission interval, based on a determined projection of the projected trendline from the trough throughput instance to the future instance.

12. The apparatus of claim 7, wherein:
the projected trendline is determined based on executing Fibonacci retracement relative to the highest trendline and the lowest trendline;
the predicted throughput is predicted based on the projected trendline extending to initiation of the future broadcast transmission interval.

13. One or more non-transitory tangible media encoded with logic for execution by a machine and when executed by the machine causing operations comprising:
determining, by the machine implemented as a network device in a wireless data network, a past throughput of broadcast data packets transmitted at broadcast transmission intervals of a prescribed broadcast schedule over a selected measurement interval, the broadcast transmission intervals each adjacent to unicast transmission intervals allocated in the wireless data network, each of the broadcast transmission intervals in the prescribed broadcast schedule initially set at a prescribed duration;
predicting a predicted throughput of a future broadcast transmission interval of the prescribed broadcast schedule, for transmission of at least a future broadcast data packet and reception of at least one future second broadcast data packet, based on executing a trendline prediction of the predicted throughput using the past throughput over the selected measurement interval; and
adjusting the corresponding prescribed duration of the future broadcast transmission interval, relative to the corresponding adjacent unicast transmission interval following the future broadcast transmission interval, based on the predicted throughput;

wherein the predicting includes:
identifying, from the past throughput, a trough throughput instance, a crest throughput instance and following the trough throughput instance, and a second lowest throughput instance following the trough throughput instance,
identifying a highest trendline between the trough throughput instance and the crest throughput instance,
identifying a lowest trendline between the trough throughput instance and the second lowest throughput instance, and
determining a projected trendline from the trough throughput instance and extending between the lowest trendline and a median trendline between the highest and lowest trendlines.

14. The one or more non-transitory tangible media of claim 13, wherein the predicting is executed by the network device at a prediction instance, the predicted throughput including transmission of a future broadcast data packet that has not yet been received by the network device as of the prediction instance.

15. The one or more non-transitory tangible media of claim 13, wherein the adjusting includes broadcasting, at initiation of the future broadcast transmission interval, an adjustment request specifying one of extending the future broadcast transmission interval to a corresponding adjusted duration beyond the corresponding prescribed duration, or reducing the future broadcast transmission interval a corresponding adjusted duration less than the corresponding prescribed duration.

16. The one or more non-transitory tangible media of claim 15, wherein:
the determining the past throughput of broadcast data packets is based on first broadcast data packets broadcast by the network device, and second broadcast data packets received by the network device;
the one or more non-transitory tangible media further operable for broadcasting the future broadcast data packet after the adjustment request and within the corresponding adjusted duration, and selectively listening within the adjusted duration for the at least one future second broadcast data packet based on the predicted throughput.

17. The one or more non-transitory tangible media of claim 13, wherein;
the projected trendline is determined based on executing Fibonacci retracement relative to the highest trendline and the lowest trendline;
the predicted throughput is predicted based on the projected trendline extending to initiation of the future broadcast transmission interval.

18. The one or more non-transitory tangible media of claim 13, wherein the executing of the trendline prediction further includes determining the predicted throughput, at a future instance associated with initiation of the future broadcast transmission interval, based on a determined projection of the projected trendline from the trough throughput instance to the future instance.

* * * * *